United States Patent [19]

Mullins et al.

[11] Patent Number: 4,734,453
[45] Date of Patent: Mar. 29, 1988

[54] HYDROLYZED COPOLYMERS OF ALPHA-CARBAMATO-ACRYLATES

[75] Inventors: Michael J. Mullins; Philip J. Brondsema, both of Midland, Mich.

[73] Assignee: The Dow Chemical Company, Midland, Mich.

[21] Appl. No.: 863,624

[22] Filed: May 15, 1986

[51] Int. Cl.$^4$ .................. C08L 37/00; C08L 31/00; C08F 8/18; C09K 7/00

[52] U.S. Cl. .................... 524/555; 524/556; 525/328.2; 525/355; 526/301; 526/310; 137/13; 252/8.514; 252/8.515

[58] Field of Search ............... 526/301, 310; 525/328.2, 355; 137/13; 524/555, 556

[56] References Cited

U.S. PATENT DOCUMENTS

| | | | |
|---|---|---|---|
| 2,563,776 | 8/1951 | Dickey et al. | 260/77.5 |
| 2,718,516 | 9/1955 | Bortnick | 260/86.1 |
| 3,537,525 | 11/1970 | Lorem | 137/13 |
| 3,558,581 | 1/1971 | Berrmann et al. | 525/355 |
| 3,654,994 | 4/1972 | Flogel et al. | 137/13 |
| 4,532,317 | 7/1985 | Rosshofer | 560/157 |

FOREIGN PATENT DOCUMENTS 0055359A 1/1982 European Pat. Off. .

OTHER PUBLICATIONS

Iwasaki et al., Tetrahedron Letters, 21, 4101 (1980).
Kolar and Olsen, *Synthesis*, 457 (1977).
Kraft and Herbst, J. Org. Chem. 10, 483 (1945).
Martell and Herbst, J. Org. Chem., 6, 878 (1941).
J. Hoch, *Comptes Rendu, Acad. Sci.*, 733 (1935).
Simon, *Compt. Rendu.*, 133 (1901).
Vineyard et al. *J. Am. Chem. Soc.*, 99 (18), 5946 (1977).

Primary Examiner—Joseph L. Schofer
Assistant Examiner—Peter F. Kulkosky

[57] ABSTRACT

A novel method for preparing alpha-carbamatoacrylates by direct condensation is disclosed. The alpha-carbamatoacrylates are used as reactants in the preparation of alpha-isocyanatoacrylates and polymers of alpha-carbamatoacrylates. The foregoing methods may be used to produce novel compounds such as hydrocarboyl alpha-isocyanatoacrylate.

5 Claims, 1 Drawing Figure

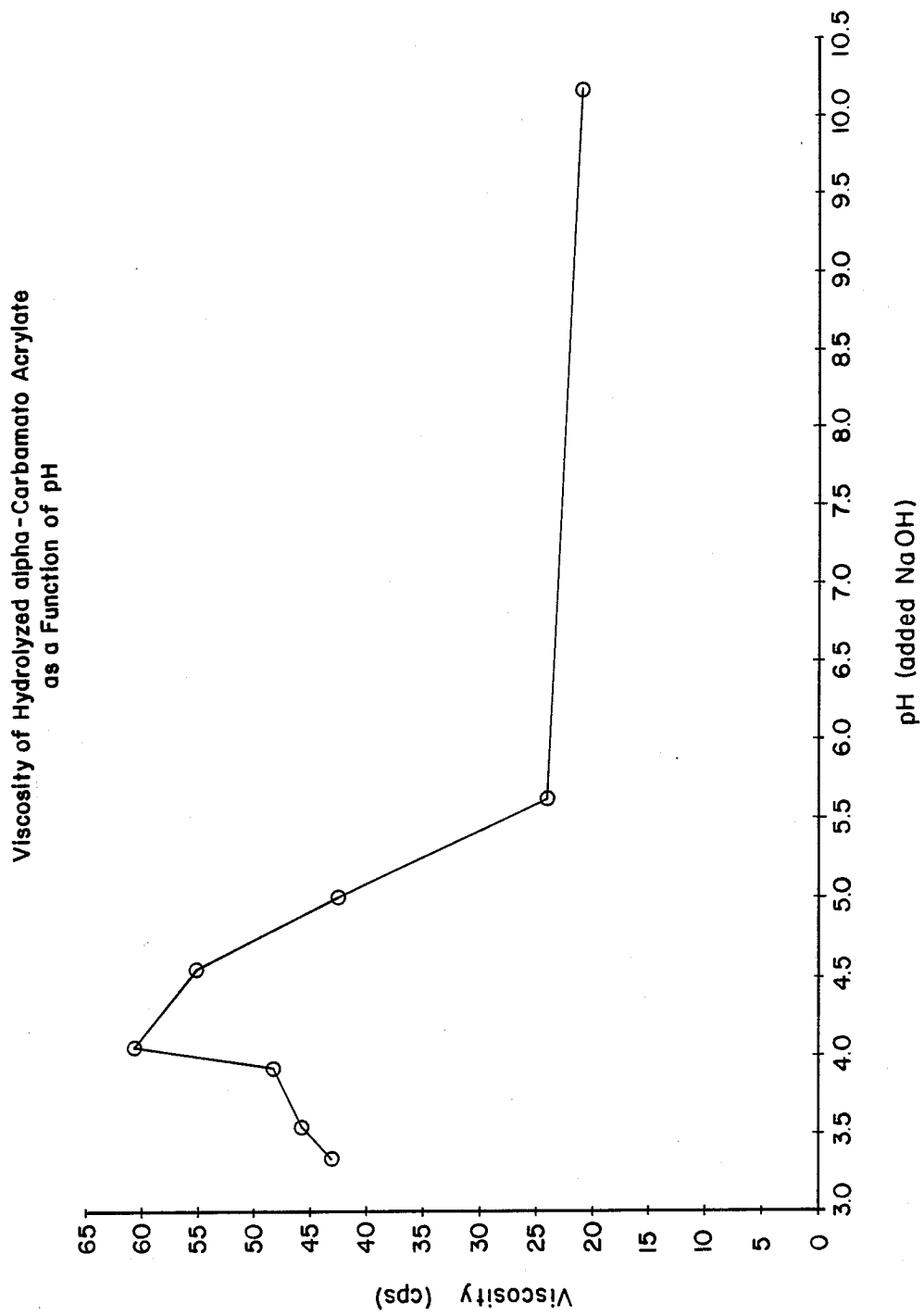

HYDROLYZED COPOLYMERS OF ALPHA-CARBAMATO-ACRYLATES

BACKGROUND OF THE INVENTION

Field of the Invention

In one embodiment this invention deals with the synthesis of alpha-carbamato acrylates. They have been disclosed in the literature, Iwasaki et al, Tetrahedron letters, 21, 4101 (1980). A specific method of preparation is not disclosed in that literature reference. Regarding general methods used for alpha-amidoacrylates see Kolar and Olsen, *Synthesis*, 457 (1977), hereby incorporated by reference. Pyruvic acid (of general formula I) wherein R=hydrogen or its esters (of general formula I) wherein R=hydrocarbonyl can condense with carbamates (of general formula II) to directly give the acrylate derivative of general formula III as shown in reaction scheme 1 below:

Scheme 1

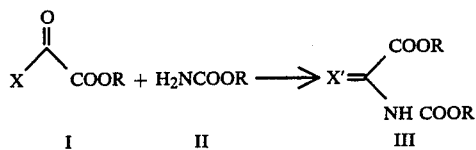

wherein X is a lower alkyl ($C_1$-$C_4$), and X' is a lower alkylene ($C_1$-$C_4$).

This result is surprising in view of the literature, for example, Kraft and Herbst, J. Org. Chem., 10, 483 (1945) and Martell and Herbst, J. Org. Chem., 6, 878 (1941), both hereby incorporated by reference. It reports only that two to one adducts of carbamates with pyruvates can be formed. A typical reaction from this literature is shown below in reaction Scheme 2:

Scheme 2

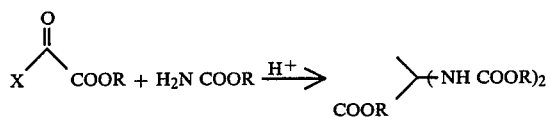

The present invention differs remarkably because novel alpha-carbamato acrylates, for example, ethyl alpha-(phenoxycarbonylamino) acrylates are produced. The reaction comprises reacting a corresponding carbamate with pyruvic acid or one of its esters, in the presence of an acidic catalyst. The present method further differs in the removal of water, for example, by isotropic distillation, to increase the conversion. The compounds produced according to the present method can be easily converted to polymers. A reaction scheme, as for example by the method disclosed in U.S. Pat. No. 2,563,776, the disclosure of which is herein incorporated by reference, as set forth in scheme 3 below can be used:

Scheme 3

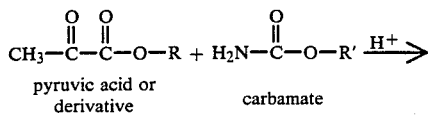

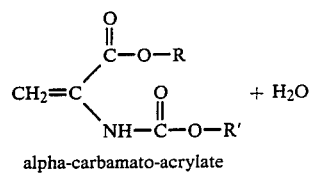

alpha-carbamato-acrylate where the acid is usually an organic acid such as p-toluene sulfonic acid, but mineral acids can also be used.

In another embodiment of the invention, a novel method involving production of alpha-isocyanatoacrylic esters and acids is disclosed. The method comprises pyrolizing a corresponding alkyl alpha-(alkoxycarbonylamino) acrylate in the presence of silica (as a catalyst) and a diluent such as nitrogen under only slight pressure. The resulting compounds contain an acrylate moiety and a reactive isocyanate substituent. These compounds have utility in coating formulations.

Bifunctional monomers which contain an isocyanate along with a readily polymerizable olefin are useful in the preparation of reactive or graft polymers. Isocyanatoethyl methacrylate is an example of such a monomer. See U.S. Pat. No. 2,718,516, hereby incorporated by reference. The market for this isocyanate is severely restricted at this time by its high cost related to the difficulty of manufacture prior to applicants' invention.

Applicants have found a new composition of matter, hydrocarbyl alpha-isocyanato acrylate. These compounds contain an acrylate moiety along with the reactive isocyanate fragment. They therefore apply in many of the same uses as that of isocyanatoethyl methacrylate previously discussed.

Pyrolysis of alpha-alkenyl carbamates to alpha-alkylisocyanates has been previously reported in the literature, for example, J. Hoch, *Comptes Rendu, Acad. Sci.*, 733, (1935); and in European Patent Application Publication No. 0055359A1 (published July 7, 1982), both hereby incorporated by reference. However, none of the prior art teaches taking an alpha-carbamato acrylate of the type indicated by general formula III and pyrolizing it to form the novel compound of the general formula IV according to reaction scheme 4:

Scheme 4

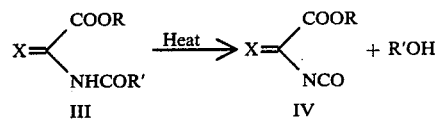

In a further embodiment of this invention a method for the production of water-soluble polymers from alpha-carbamato acrylates having recurring units of the following formula:

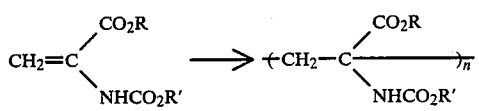

where n being the degree of polymerization. In the above structure, R is hydrocarbyl or hydrogen, R' is hydrocarbyl with hydrogen excluded.

The polymers prepared from alpha-carbamato acrylates may use a variety of radical initiators forming high molecular weight polymers. The poly (carbamate) ester products are then hydrolyzed and acidified to produce poly(amino)carboxylic acids. Percentage of hydrolysis can vary from 5 to 100% of either the ester function or the carbamate function.

Unique ionic polymers result from alkaline hydrolysis of the initial polymers; although the product is shown as the product of complete hydrolysis, only partial hydrolysis occurs under experimental conditions. These polymers, which comprise a mixture of ester and carbamate groups exhibit unusual pH dependence on viscosity $$\underset{\substack{|\\ NHCO_2R'}}{+CH_2-C+_n} \xrightarrow{\substack{(1)\ NaOH \\ (2)\ HCl}} \underset{\substack{|\\ NH_2}}{+CH_2-C+_n}$$

The foregoing polymers are useful as water-thickening agents, for example, for drilling liquids, and as additives in coating formulations containing other monomers, for example, acrylates, to improve adhesion to surfaces such as glass or metal. The polymers are hard, clear and colorless. More particularly, the non-ionic polymers can be used as a light or heat curable adhesive. The utility for the hydrolyzed polymer is its use in ion exchange resins.

SUMMARY OF THE INVENTION

In one embodiment, this invention deals with a method of forming an alpha-carbamato acrylate of the formula III:

$$X'=\!\!\!<\!\!\!\begin{array}{l} COOR \\ NHCOOR' \end{array} \qquad (III)$$

wherein R and R' are the same or different and represent hydrogen or hydrocarbyl and X' is a lower alkylene by condensing a compound of formula I:

$$\underset{X}{\overset{O}{\overset{\|}{\diagup\!\!\!\diagdown}}} COOR' \qquad (I)$$

wherein R' is as defined above with a compound of formula II and X is a lower alkyl:

$$\underset{H_2N-C-O-R}{\overset{O}{\overset{\|}{}}} \qquad (II)$$

wherein R is as defined above in the presence of an acid catalyst and obtaining the resultant alpha-carbamato acrylate.

In a second embodiment, this invention concerns a compound of the formula VI:

$$X'=\!\!\!<\!\!\!\begin{array}{l} COOR \\ NCO \end{array} \qquad (VI)$$

wherein R is hydrogen or hydrocarbyl and X' is a lower alkylene.

In a third embodiment, this invention comprises the method of preparing alpha-isocyanato acrylates comprising subjecting a compound of formula III:

$$X'=\!\!\!<\!\!\!\begin{array}{l} COOR \\ NHCOOR' \end{array} \qquad (III)$$

wherein R and R' are the same or different and represent hydrogen or hydrocarbyl and X' is a lower alkylene to pyrolysis conditions in the presence of a catalyst and recovering the alpha-isocyanato acrylate.

In a fourth embodiment this invention includes a polymer of recurring units of formula IX:

$$\underset{\substack{|\\ NH_2}}{(CH_2-C)_n^{CO_2H}} \qquad (IX)$$

wherein n represents the degree of polymerization.

In a further embodiment this invention concerns the method of polymerizing an alpha-carbamato acrylate by subjecting a compound of formula III:

$$X'=\!\!\!<\!\!\!\begin{array}{l} COOR \\ NHCOOR' \end{array} \qquad (III)$$

wherein R is hydrocarbyl or hydrogen, R' represents hydrocarbyl and X' is a lower alkylene, to radical initiation conditions to form a polymer of formula X:

$$\underset{\substack{|\\ NHCO_2R'}}{(CH_2-C\!\!-\!\!)_n^{CO_2R}} \qquad (X)$$

wherein R and R' are as defined above and n represents the degree of polymerization, hydrolyzing the compound of formula X and obtaining a polymer of recurring units of:

$$\underset{\substack{|\\ NH_2}}{(CH_2-C\!\!-\!\!)_n^{CO_2R}}$$

wherein R and n are as defined above.

BRIEF DESCRIPTION OF THE DRAWINGS

The sole FIGURE is a graphic representation of the effect of pH on the viscosity of hydrolyzed alpha-carbamato acrylate.

DETAILED DESCRIPTION OF THE INVENTION

Prior to applicants' invention acrylic acids and esters were prepared from alpha, alpha-bis-(alkoxycarbonamido)-propinic acids as illustrated by the following reaction:

$$\underset{(NH-COOR);}{CH_3-C-COOH} \xrightarrow{HOAC}$$

-continued

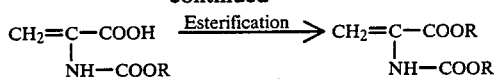

Surprisingly, the applicants have found that acrylic acids and esters can be formed directly by the condensation of pyruvic acid (or its esters) with carbamates to give the alpha-carbamato acrylate by the reaction as shown below:

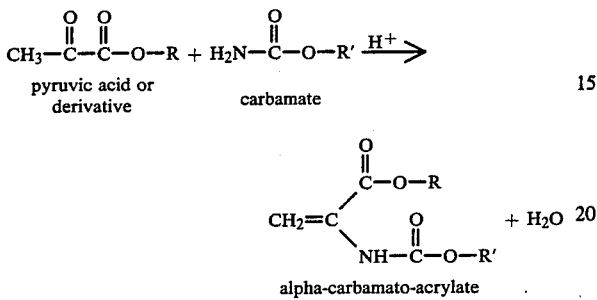

The process utilizes an acidic catalyst and the removal of water, for example, by isotropic distillation, increases the conversion. The compounds produced according to the method can be easily converted to polymers as will be described more fully below. Applicants have found that the reaction parameters can vary within wide limits such as carrying out the process at temperatures between 0° and 200° C. with the preferred temperature being 70°–120° C. Typical temperatures are greater than about 50° C., typically between 70°–90° C. Reaction temperature is too hot when just polymerization occurs. It is too cold when no reaction occurs. The process can be carried out in the presence of nearly any solvent with toluene being preferred although the process may also be carried with no solvent. Other solvents include benzene, chloroform, chlorobenzene and etherial solvents. The solvent should be stable to acid and not hydroxides. The pressure limitations are conventional and vary from 1 millimeter Hg vacuum to 10 atmospheres with a preferred pressure of ambient if toluene is used as the solvent or 40 millimeters Hg if no solvent is present. The pressure is typically slightly below or above atmospheric pressure. As stated previously, the removal of water facilitates the conversion but dessicants such as $MgSO_4$ and $CaCl_2$ can also be used in place of or in addition to distillation to effect water removal. The preferred method of water removal is azeotropic distillation. As the acid catalyst, applicants have found that mineral acids, organic sufonates and carboxylic acids may be employed individually or in combination. The preferred catalysts are toluene sulfonic acid and hydrochloric acid. The pKa of acid catalyst is less than or equal to about 5. The reactants and products of the present invention can have the following R and R' groups:

| When R is | R' can be |
|---|---|
| $-CH_3$ | $-CH_3$ |
| $-CH_3$ | $CH_6H_5$ |
| $-CH_2H_5$ | $-CH_3$ |
| H | $-CH_3$ |

Thus, when R is methyl or ethyl, R' is any alkyl or aromatic hydrocarbon. Regarding pyruvic acid, see generally Simon, *Compt. Rendu.*, 133 (1901), hereby incorporated by reference.

The unsaturated products produced by the present invention have been hydrogenated to optically active alpha-amino acid derivatives as reported by Vineyard et al, *J. Am. Chem. Soc.*, 99 (18), 5946 (1977), the disclosure of which is incorporated by reference. Perhaps more importantly, the acrylate derivatives in which R'=R=H readily polymerize using a variety of radical anionic initiators to high molecular weight polymers. They provide entry into a unique class of ampholytic polymers which have unusual properties which will be described more fully hereinbelow.

EXAMPLES

The synthesis of the alpha-carbamato acrylates will be better understood with reference to the following non-limiting examples:

Example 1

Synthesis of Ethyl alpha-(phenoxycarbonylamino)-acrylate (general formula III, wherein R=$C_2H_5$, R'=phenyl)

A solution of phenyl carbamate (10.00 g, 7.29 mmol) plus methyl pyruvate (7.44 g, 7.29 mmol) plug p-toluenesulfonic acid (0.30 g) in 70 ml toluene is refluxed for 135 minutes under a nitrogen atmosphere using a Dean-Stark trap to remove water. A fritted glass filter funnel is partially filled (75 ml of 150 ml) with silica gel and the cooled crude reaction mixture is poured on top. Additional toluene (200 ml) is used to rinse the silica gel. The filtrate is evaporated to provide 5.22 g of the title compound. An analytical sample (mp 64°–65° C.) is obtained by twice recrystallizing this material from toluene. All spectral data ($^1H$ and $^{13}C$ NMR, infrared) is consistent with the assigned structure.

Example 2

Synthesis of Ethyl alpha-(methoxycarbonylamino)-acrylate (general formula III, wherein R=$C_2H_5$, R'=$CH_3$)

A solution containing methyl carbamate (37.83 g, 0.500 mol), ethyl pyruvate (43.40 g, 0.380 mol), m-dinitrobenzene (polymerization inhibitor, 0.95 g), n-decane (gas chromatography standard, 1.000 g), and p-toluenesulfonic acid (0.60 g) in 70 ml toluene is vigorously refluxed using a Dean-Stark trap to remove azeotroped water. After 90 minutes, 8.0 ml water (100% of theory) is collected; and the reaction is stopped. The toluene is evaporated, and the crude material quickly vacuum distilled (55°–70° C. at 1.0 mm Hg) to give 36.84 g of a colorless crystalline solid (mp 99° C.) which is analyzed by gas chromatography to be at least 99% pure, with the major contaminant being methyl carbamate.

Example 3

Synthesis of Methyl alpha-(methoxycarbonylamino)-acrylate (general formula III, wherein R=$CH_3$, R'=$CH_3$)

A solution containing methyl carbamate (67.73 g, 0.900 mol), methyl pyruvate (50.37 g, 0.490 mol), hydroquinone (polymerization inhibitor, 1.02 g), n-decane (gas chromatography standard, 1.05 g), and p-toluenesulfonic acid (1.02 g) in 70 ml toluene is vigorously refluxed using a Dean-Stark trap to remove azeotroped water. After 115 minutes, 15.5 ml water is collected, and the reaction is stopped. The toluene is evaporated, and the crude material quickly vacuum distilled (45°–60° C. at 1.0 mm Hg) to give 31.6 g of a colorless crystalline solid (mp 99° C.) which is analyzed by gas chromatography to be at least 99% pure, with the major contaminant being methyl carbamate. UV data: lambda$_{max}$=243 nm, epsilon=4850 in MeOH.

Example 4

Synthesis of alpha-(methoxycarbonylamino)-acrylic acid (general formula III, wherein R=H, R'=CH$_3$)

A solution pyruvic acid (4.40 g, 50.0 mmol), methyl carbamate (3.75 g, 50.0 mmol), hydroquinone (used for a polymerization inhibitor, 0.05 g), and p-toluene sulfonic acid (50 mg) in 30 ml benzene is refluxed in a 100 ml round bottom flask to which is attached a Dean-Stark trap. The system is exposed to air during the reaction. After 2 hours, 25 minutes, 0.60 ml water (33 mmol) accumulates in the trap. The yellow solution is hazy while warm, but a small amount of gelatinous precipitate accumulated upon cooling. The suspension is filtered and is evaporated. Proton nuclear magnetic resonance spectrosopy confirms the presence of the title compound; (CDCl$_3$, ppm) 10.0–10.5 (1H, broad singlet), 5.4 (1H, broad singlet), 5.1 (1H, broad singlet), 4.5–5.0 (1H, broad singlet), 3.9 (3H, singlet).

The foregoing alpha-carbamato acrylates are useful materials for producing alpha-isocyanato acrylate esters and acids. Additionally, the alpha-carbamato acrylates can be used in the manufacture of water-soluble polymers by a method more fully described hereinbelow. The subject polymers are peculiar in that they exhibit unusual pH dependency on viscosity.

The production of alpha-isocyanate acrylate esters and acids are extremely expensive. However, the method of the invention is more economical and comprises pyrolyzing a corresponding alpha-(alkoxycarbonylamino) acrylate in the presence of silica as a catalyst. The presence of diluent nitrogen under low pressure facilitates obtaining the subject compounds having both an acrylate moiety and a reactive isocyanate substituent. These bifunctional monomers, which contain an isocyanate along with a readily polymerizable olefin, are useful in the preparation of reactive or grafted polymers. Isocyanatoethyl methacrylate is an example of such a monomer. Additionally, the present process may be utilized to produce a new composition of matter, i.e., hydrocarbyl alpha-isocyanatoacrylate. The following reaction outlines synthesis of the new composition of matter although it will be appreciated that the method described will be useful in producing other isocyanates. The reaction utilizes methyl alpha (methoxycarbonylamino)-acrylate of general formula V

(V)

which is subjected to pyrolysis in the presence of silica and a nitrogen diluent to produce hydrocarbyl alpha-isocyanatoacrylate of the formula VI

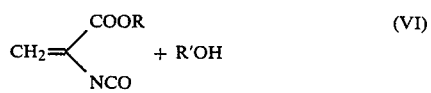
(VI)

plus corresponding alcohol. In the foregoing reaction, R is hydrocarbyl; and R' is methyl. However, a starting compound, where R=R'=methyl, may also be utilized.

The foregoing method of synthesis is understood more fully with reference to the following non-limiting examples:

Example 5

Preparation of Methyl alpha-Isocyanatoacrylate

A 30 mm by 30 cm pyrex tube with a thermocouple well is charged with Davison Grade 59 silica (38.6 g). The silica is preconditioned by heating the tube in a vertical furnace at 350° C. overnight under a slow flow of nitrogen. The silica is then cooled and reweighed. An addition funnel is placed on top of the catalyst tube, and the bottom of the catalyst tube is connected to two traps. The trap closest to the reactor is cooled to 0° C., and the second is cooled to −78° C. Methyl alpha-(methoxycarbonylamino)-acrylate (9.20 g, 0.058 mol) is measured into the addition funnel, and the entire system is evacuated. A nitrogen bleed is begun at the top of the addition funnel; and with a total pressure of 5 mm Hg, the acrylate is added over a 45 minute period. After the pyrolysis was completed, the system is vented to atmospheric pressure with nitrogen; and the two traps and the catalyst bed are weighed. The catalyst mass increased by 1.06 g, the 0° C. trap contained 3.69 g and the −78° C. trap contained 2.18 g, for a 75% mass balance. According to gas chromatography, the −78° C. trap contained methanol. The liquid contents of the −0° C. trap, approximately 75% of the title isocyanate according to $^1$H NMR, are quickly distilled (0.5mm, bp 20°–30° C.) to yield the title isocyanate (1.61 g, 23% yield).

Infrared: (CDCl$_3$, cm$^{-1}$) 2237, 1725.

$^1$H NMR: (CDCl$_3$, ppm) 5.8 (1H, s), 5.5 (1H, s), 3.9 (3H, s).

$^{13}$C NMR: (CDCl$_3$, ppm) 163.7, 131.3, 115.1, 53.4.

Mass Spectrum (70 eV, m/e) 141 (17%), 113 (21%), 96 (21%), 85 (6%), 68 (100%).

Example 6

Preparation of Methyl alpha-Isocyanatoacrylate

The apparatus and procedure used in Example 6 are repeated except that the tube is filled with silica-alumina (Strem, 87% silica, 52.39 g after drying). A solution of methyl alpha-(methoxycarbonylamino)-acrylate (5.86 g, 0.37 mmol) in 10 ml toluene is passed down the column. Both traps are cooled to −78° C., and the contents are combined for analysis. $^1$H NMR of the reaction products (14.2 g including toluene) indicated a 90% conversion of starting material and a 50% yield of isocyanate.

Example 7

Preparation of N-Phenyl-N'-1-(1-methoxycarbonyl-ethenyl)urea

A sample of methyl alpha-isocyanatoacrylate (50% by weight solution in toluene, 0.11 g) is combined with aniline (0.13 g) in 5 ml toluene at ambient temperature. After stirring for 1 hour, the solution is washed twice with 2 ml 1M HCl and twice with water. White crystals form during the washing process. The crystals are filtered off and are dried to constant weight (44 mg, mp 104°–106° C.).

Analysis, calculated for C$_{11}$H$_{12}$N$_2$O$_3$:

C,59.99%; H,5.49%; N,12.72%.
Found: C,59.8%; H,5.45%; N,12.76%.
$^1$H NMR (ppm, CDCl$_3$) 7.1–7.6 (m, 7H), 6.39 (s, 1H, 5.80 (broad singlet, 1H), 3.82 (s, 3H).

The ease by which the foregoing alpha-isocyanatoacrylates are formed will reduce their cost making this use in coating formulations more attractive.

Another use for the alpha-carbamatoacrylates are as reactants in a method of preparing water-soluble polymers. These polymers can be derived from alpha-carbamatoacrylates such as ethyl alpha-(methoxycarbonylamino) acrylate and related hydrocarbyl 2-(hydrocarbyloxycarbonylamino-2-propenoates) by polymerizing these compounds in the presence of radical initiators to form high molecular weight polymers. The poly(carbamate) ester products are then hydrolyzed and acidified to produce poly(amino) carboxylic acids. The percentage of hydrolysis can vary from 5 to 100% of either the ester function or the carbamate function.

These polymers are useful as water-thickening agents and as additives including formulations containing other monomers, for example, acrylates, to improve adhesion to surfaces for example, glass or metal. The polymers are hard, clear and colorless. More particularly, the non-ionic polymer can be used as a light or heat curable adhesive and is also useful in conversion to polymeric amino acid. Polymers which are derived from phenylcarbamate compounds are effective cross-linking agents for acrylate polymers. Because the polymerization of these materials may be initiated using light, they may be incorporated into ultra-violet coating formulations to speed the curing and improve adhesion. The hydrolyzed polymer also finds utility in ion exchange resins. The hydrolyzed polymer can be in the neutralized or ionic form.

The reaction will be more particularly described in connection with the polymerization of alpha-carbamato acrylates and hydrolysis of the resultant polymers. In the first step of the process, the alpha-carbamato acrylates readily polymerize utilizing a variety of radical initiators to form high molecular weight polymers by the following reaction:

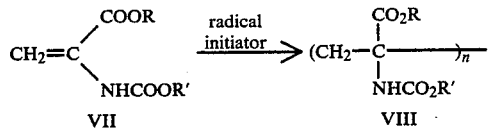

wherein in the foregoing R is hydrocarbyl or hydrogen, R' is hydrocarbyl with hydrogen excluded, and n indicates the degree of polymerization.

These polymers may be hydrolyzed in the following manner:

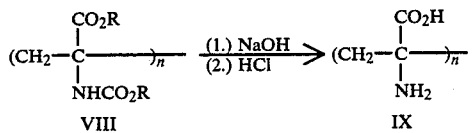

wherein R, R', and n are as described above.

The polymerization of these materials may be initiated using light as shown in the following non-limiting example.

Example 8

Polymerization By Light

Two glass plates are strongly bonded together after exposing a solution of benzoin diethyl acetal (1.5 wt %) in methyl alpha-(methylcarbonylamino)-acrylate to an untraviolet lamp for 5 minutes. The plates could not be separated without breaking them. This experiment demonstrates the ease of curing these monomers and their utility in ultraviolet coating application for glass, metal and other substrates.

As can be seen from the accompanying figure, the hydrolyzed alpha-carbamatoacrylates have a unique pH dependence on viscosity. At pH between about 3.2 and 5.7, the viscosity is highly dependent upon pH wherein above a pH of about 5.7 viscosity is relatively constant. Thus by varying the pH within the highly dependent viscosity range properties, the polymer may be adjusted to suit conditions of use. For example, viscosity differences such as are encountered in divergent uses such as adhesives, super glues or coatings may be satisfied by mere pH adjustment of the polymer. Moreover, inclusion as an addition for materials such as drilling mud permits easy manipulation of the viscosity of the mud merely by adjustment of the pH. This presents an unexpected advantage of the invention over prior art polymers.

The invention will be more fully understood with reference to the following non-limiting examples.

Example 9

Radical Initiated Polymerization of Ethyl alpha-(methoxycarbonylamino)acrylate A sample of the title acrylate (6.4058 g, 40.3 mmol) is added to a glass vial containing benzoyl peroxide (32.3 mg, 0.133 mmol, 0.331 mol %). The vial is gently warmed to melt the acrylate, and the peroxide dissolves. The vial is placed in an oven at 53° C. for one hour. The material is quite viscous at this point and will not pour. The vial is further heated to 60° C. for 85 minutes, 79° C. for one hour, and 15 hours at 99° C. The vial is broken, and the glass sticking to the clear polymer carefully removed. A size exclusion chromatographic molecular weight analysis reveals Mw 1,053,000 and Mn 241,000 relative to polystyrene in methylene chloride.

Example 10

Radical Initiated Polymerization of Ethyl alpha-(methoxycarbonylamino)acrylate A solution of the acrylate (13.56 g) in tetrahydrofuran (50.0 ml) is allowed to stand in a capped bottle for 14 days. An extremely viscous, colorless solution of polymer resulted. The polymer is isolated by removal of the solvent under vacuum.

Example 11

Use of Methyl alpha-(methoxycarbonylamino)acrylate As a Light Curable Adhesive A mixture of benzoin diethyl acetal (2.1 mg) in the title acrylate (136.6 mg) is gently warmed to form a solution. A small amount of this solution is placed between two lapped microscope slides. The slides are then exposed to an ultraviolet sunlamp (General Electric 250 W, 15 cm from the face) for 4 minutes. The slides could not be separated without breaking the glass. A similar experiment using two NaCl plates indicates that after 5 minutes of exposure to the lamp the olefin band in the infrared spectrum of the monomer (1635 cm$^{-1}$) nearly disappears.

Example 12

Polymerization of methyl alpha-(phenoxycarbonylamino)-acrylate

A mixture of benzoin diethyl acetal (1.0 μl) in the title acrylate (46.2 mg) is gently warmed in a small vial to form a solution. The vial is then exposed to an ultraviolet sunlamp (General Electric 250 W, 15 cm from the face) for 5 minutes. The polymer swells but would not dissolve in CH$_2$Cl$_2$ and appears crosslinked.

Example 13

Hydrolysis To Form a Poly(amino-acid)

A 1.978 g sample of poly(ethyl alpha-(methylcarbonylamino) acrylate is placed in a 50 ml flask along with 25 ml of 1.0M NaOH. After refluxing the suspension under a nitrogen atmosphere for 16 hours, most of the polymer dissolves. The yellow solution is decanted into a second flask and acidified with concentrated HCl to pH 3, which precipitated a white solid. After filtering the solid and pressing it to remove water, it is dried to constant weight at ambient temperature using a vacuum to yield 0.77 g of a light tan solid.

Dissolution of 100.0 mg of this material in 20.0 ml deionized water gives a solution with a viscosity of 43.2 centipoise (Brookfield viscometer, 15 sec$^{-1}$ sheer rate) and a pH of 3.34. Addition of 55 uL of 1.0M NaOH increases the viscosity to 60.6 centipoise and the pH to 4.05.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. An adhesive composition comprising an effective amount of a polymer having recurring units of the formula IX:

wherein n represents the degree of polymerization.

2. A water-thickening composition comprising an adhesive composition comprising an effective amount of a polymer having recurring units of the formula IX:

wherein n represnts the degree of polymerization.

3. A method of controlling viscosity of a liquid comprising adding an effective amount of a polymer having recurring units of the formula IX:

wherein n represents the degree of polymerization and adjusting the pH of the liquid.

4. The method of claim 3, wherein the liquid is a drilling liquid.

5. A composition comprising an effective amount of polymer having recurring units of the formula IX:

wherein n represents the degree of polymerization.

* * * * *

UNITED STATES PATENT AND TRADEMARK OFFICE
CERTIFICATE OF CORRECTION

PATENT NO. : 4,734,453

DATED : March 29, 1988

INVENTOR(S) : Michael J. Mullins and Philip J. Brondsema

It is certified that error appears in the above-identified patent and that said Letters Patent is hereby corrected as shown below:

On the Title Page:

References cited, (Foreign) "1/1982" should be --7/1982--.

Column 2, line 37, "alkylisocyanates" should be --alkenylisocyanates--.

Column 5, line 52, "sufonates" should be --sulfonates--.

Column 5, line 63, "$CH_6H_5$" should be --$C_6H_5$--.

Column 6, line 25, "plug" should be --plus--.

Column 7, line 53, "alpha" should be --alpha- --.

Column 8, line 32, "-0°C" should be --0°C--.

Column 10, line 7, "untraviolet" should be --ultraviolet--.

Column 12, line 21, "represnts" should be --represents--.

Signed and Sealed this

Tenth Day of January, 1989

*Attest:*

DONALD J. QUIGG

*Attesting Officer*  *Commissioner of Patents and Trademarks*